US010730968B2

(12) United States Patent
Lee et al.

(10) Patent No.: US 10,730,968 B2
(45) Date of Patent: Aug. 4, 2020

(54) METHOD FOR PREPARING MODIFIED CONJUGATE DIENE POLYMER

(71) Applicant: LG Chem, Ltd., Seoul (KR)

(72) Inventors: Tae Chul Lee, Daejeon (KR); Hae Sung Sohn, Daejeon (KR); He Seung Lee, Daejeon (KR); No Ma Kim, Daejeon (KR)

(73) Assignee: LG Chem, Ltd. (KR)

( * ) Notice: Subject to any disclaimer, the term of this patent is extended or adjusted under 35 U.S.C. 154(b) by 67 days.

(21) Appl. No.: 15/741,596

(22) PCT Filed: Dec. 16, 2016

(86) PCT No.: PCT/KR2016/014829
§ 371 (c)(1),
(2) Date: Jan. 3, 2018

(87) PCT Pub. No.: WO2017/105144
PCT Pub. Date: Jun. 22, 2017

(65) Prior Publication Data
US 2018/0201699 A1     Jul. 19, 2018

(30) Foreign Application Priority Data
Dec. 18, 2015 (KR) ................... 10-2015-0181788

(51) Int. Cl.
| C08F 2/06 | (2006.01) |
| C08F 8/42 | (2006.01) |
| C08F 236/10 | (2006.01) |
| B60C 1/00 | (2006.01) |
| C08K 3/36 | (2006.01) |
| C08C 19/26 | (2006.01) |
| C08L 9/06 | (2006.01) |
| C08K 3/04 | (2006.01) |

(52) U.S. Cl.
CPC ............... *C08F 8/42* (2013.01); *B60C 1/00* (2013.01); *B60C 1/0016* (2013.01); *C08C 19/26* (2013.01); *C08F 236/10* (2013.01); *C08K 3/04* (2013.01); *C08K 3/36* (2013.01); *C08L 9/06* (2013.01); *Y02T 10/862* (2013.01)

(58) Field of Classification Search
CPC . C08L 43/04; C08L 9/00; C08L 53/02; C08C 19/44; C08C 19/25; C08C 19/42
See application file for complete search history.

(56) References Cited

U.S. PATENT DOCUMENTS

| 4,491,658 | A | * | 1/1985 | Sugimori ................. C08C 1/14 523/335 |
| 5,650,536 | A | | 7/1997 | Darikworth et al. |
| 7,807,747 | B2 | * | 10/2010 | Oshima .................... C08L 15/00 524/571 |
| 2004/0127645 | A1 | | 7/2004 | Ko et al. |
| 2004/0225038 | A1 | * | 11/2004 | Lin ........................... B60C 1/00 524/109 |
| 2008/0103261 | A1 | | 5/2008 | Tanaka et al. |
| 2010/0016500 | A1 | | 1/2010 | Sone et al. |
| 2015/0166738 | A1 | | 6/2015 | DeDecker et al. |
| 2016/0053059 | A1 | | 2/2016 | Kim et al. |
| 2016/0176991 | A1 | * | 6/2016 | Dire ........................ C08C 19/25 525/52 |
| 2016/0177011 | A1 | | 6/2016 | Kim et al. |
| 2016/0208023 | A1 | | 7/2016 | Lee et al. |
| 2017/0022300 | A1 | | 1/2017 | Hirahara et al. |
| 2019/0352433 | A1 | * | 11/2019 | Dessendier ............. C08C 19/44 |

FOREIGN PATENT DOCUMENTS

| EP | 1829925 A1 | 9/2007 |
| EP | 2581391 A1 | 4/2013 |
| JP | H10502106 A | 2/1998 |
| JP | 2013129693 A | 7/2013 |
| JP | 2013155365 A | 8/2013 |
| JP | 2014209137 A | 11/2014 |
| JP | 2015520789 A | 7/2015 |
| KP | 100961383 B1 | 6/2010 |
| KR | 20040051183 A | 6/2004 |
| KR | 100834962 B1 | 6/2008 |
| KR | 20140127749 A | 11/2014 |
| KR | 20150021550 A | 3/2015 |
| WO | 2015056898 A1 | 4/2015 |
| WO | 2015057021 A1 | 4/2015 |
| WO | 2015093611 A1 | 6/2015 |

OTHER PUBLICATIONS

Search report from International Application No. PCT/KR2016/014829, dated Mar. 20, 2017.
Extended European Search Report including Written Opinion for Application EP16876086.6 dated Apr. 17, 2018.
Chinese Search Report for Application No. CN 2016800432036 dated Jul. 2, 2019.

\* cited by examiner

*Primary Examiner* — Gregory Listvoyb
(74) *Attorney, Agent, or Firm* — Lerner, David, Littenberg, Krumholz & Mentlik, LLP

(57) ABSTRACT

The present invention relates to a method of preparing a modified conjugated diene-based polymer, and more particularly, to a method of preparing a modified conjugated diene-based polymer, including: (S1) preparing an active polymer with an organic metal bonded thereto by polymerizing a conjugated diene-based monomer in a hydrocarbon solvent in the presence of an organometallic compound; and (S2) mixing the active polymer prepared according to process S1 with a modifier, wherein the mixing of process S2 is performed at a Reynolds number of 20 or less for 1 minute or more, the Reynolds number being maintained within a range of ±5 of a Reynolds number when the modifier is added (wherein the range is between greater than 0 to 20 or less).

7 Claims, No Drawings

METHOD FOR PREPARING MODIFIED CONJUGATE DIENE POLYMER

CROSS-REFERENCE TO RELATED APPLICATIONS

The present application is a national phase entry under 35 U.S.C. § 371 of International Application No. PCT/KR2016/014829 filed Dec. 16, 2016, which claims priority from Korean Patent Application No. 10-2015-0181788 filed Dec. 18, 2015, all of which are incorporated herein by reference.

The present invention relates to a method of preparing a modified conjugated diene-based polymer, and more particularly, to a method of preparing a modified conjugated diene-based polymer that has excellent rolling resistance properties, excellent tensile properties, high wet skid resistance, and low rolling resistance.

BACKGROUND ART

According to the recent requirement for automobiles to be fuel-efficient, conjugated diene-based copolymers, which have low rolling resistance, excellent tensile properties, and handling stability represented as wet skid resistance, are required as a rubber material for tires.

To reduce the rolling resistance of tires, there is a method of decreasing the hysteresis loss of vulcanized rubber. As evaluation standards of such vulcanized rubber, repulsive elasticity at 50° C. to 80° C., tan δ, Goodrich heating, and the like are used. That is, rubber materials with high repulsive elasticity at the above-described temperature range or low tan δ and Goodrich heating are preferably used.

As rubber materials having a low hysteresis loss, natural rubber, polyisoprene rubber, polybutadiene rubber, and the like are known, but these materials have low wet skid resistance. Thus, conjugated diene-based polymers or copolymers such as styrene-butadiene rubber (SBR) or butadiene rubber (BR), prepared by emulsion polymerization or solution polymerization, have recently been used as rubber for tires. Among these, the biggest advantage of solution polymerization over emulsion polymerization is that the contents of a vinyl structure and styrene, which determine physical properties of rubber, may be arbitrarily adjusted, and molecular weights, physical properties, and the like may be adjusted by coupling, modification, or the like. Thus, SBR prepared by solution polymerization through which it is easy to structurally change the finally prepared SBR or BR, movement of chain ends may be decreased by binding or modifying the chain ends, and the SBR may have increased binding strength with a filler such as silica, carbon black, or the like is widely being used as a rubber material for tires.

When such solution-polymerized SBR is used as a rubber material for tires, a glass transition temperature of rubber may be increased by increasing a vinyl content in the SBR, and thus physical characteristics required for tires, such as driving resistance and braking force, may be adjusted, and fuel consumption may also be reduced by appropriately adjusting the glass transition temperature. The solution-polymerized SBR is prepared using an anionic polymerization initiator, and chain ends of the formed polymer are bonded using various modifiers or are modified. However, when a reaction or coupling does not properly occur between the chain ends of the formed polymer and a modifier to be reacted or coupled therewith, an enhancement effect of physical properties required for tires, to be achieved due to the modified portion, is insufficient. For example, Japanese Patent Laid-Open Publication No. 2013-129693 discloses a method of preparing a modified conjugated diene-based polymer in which a reaction between a conjugated diene-based polymer and a modifier having an alkoxysilyl group occurs while stirring at a stirring power of 1 kW/m³ to 50 kW/m³, to enhance a modification rate. However, according to the preparation method, the modification rate of the conjugated diene-based polymer is still insufficient, and a molecular weight distribution of the modified conjugated diene-based polymer is also widened, and, accordingly, driving resistance is increased.

Therefore, there is a need to continuously conduct studies on methods of preventing physical properties of a conjugated diene-based polymer itself from deteriorating and efficiently enhancing an enhancement effect of the physical properties, derived from a modifier, in a reaction between the conjugated diene-based polymer and the modifier to prepare a modified conjugated diene-based polymer.

DISCLOSURE

Technical Problem

The present invention has been made in view of the above problems, and it is an object of the present invention to provide a method of preparing a modified conjugated diene-based polymer that has excellent rolling resistance properties, excellent tensile properties and wet skid resistance, and low rolling resistance.

Technical Solution

According to an embodiment of the present invention, there is provided a method of preparing a modified conjugated diene-based polymer, including: preparing an active polymer with an organic metal bonded thereto by polymerizing a conjugated diene-based monomer in a hydrocarbon solvent in the presence of an organometallic compound (S1); and mixing the active polymer prepared according to process S1 with a modifier (S2), wherein the mixing of process S2 is performed at a Reynolds number of 20 or less for 1 minute or more, the Reynolds number being maintained within a range of ±5 of a Reynolds number when the modifier is added (wherein the range is between greater than 0 to 20 or less).

Advantageous Effects

When a modified conjugated diene-based polymer is prepared according to the present invention, the modified conjugated diene-based polymer can have excellent rolling resistance properties, excellent tensile properties and wet skid resistance, and low rolling resistance, and the prepared modified conjugated diene-based polymer can be used in a rubber composition for tires.

BEST MODE

Hereinafter, the present invention will be described in more detail with reference to examples and experimental examples. However, these examples are provided for illustrative purposes only and are not intended to limit the scope of the present invention.

EXAMPLES

Example 1

0.27 kg of styrene, 0.71 kg of 1,3-butadiene, 5 kg of n-hexane, and 0.86 g of ditetrahydrofurylpropane as a polar additive were put into a 20 L autoclave reactor having an inner diameter of 25 cm and a height of 40 cm and equipped with a two-layered impeller having a 12 cm pitched paddle shape, a stirring rate of the reactor was maintained at 300 rpm, and then the temperature inside the reactor was raised to 40° C. When the temperature inside the reactor reached 40° C., 9.4 mmol of n-butyllithium was put into the reactor, and then an adiabatic heating reaction took place. After 40 minutes, 20 g of 1,3-butadiene was added to the reactor. After 5 minutes, the stirring rate of the reactor was decreased to 60 rpm and 1.5 g of triethoxysilylpropylaminopropylimidazole was added thereto for 10 seconds. After adding the modifier, the Reynolds number of the mixture of the polymerized product and the modifier inside the reactor was 7.2, a reaction proceeded while mixing for 15 minutes, and then 3 g of ethanol was put into the reactor to stop the polymerization reaction, 5 ml of an IR1520 (manufactured by BASF) solution as an antioxidant was added thereto, and the resulting mixture was further stirred for 10 minutes. The solvent was removed from the resulting polymerized product in hot water heated with steam, and then the polymerized product was roll-dried to remove the remaining solvent and water, thereby completing the preparation of a modified conjugated diene-based polymer.

Example 2

In a continuous reactor in which 200 L of an autoclave reactor and 100 L of an autoclave reactor were connected in series, the first stage autoclave reactor was supplied with a styrene solution prepared by dissolving 30 wt % of styrene in n-hexane at a rate of 7.17 kg/h; a 1,3-butadiene solution prepared by dissolving 30 wt % of 1,3-butadiene in n-hexane at a rate of 26.17 kg/h; n-hexane at a rate of 30.46 kg/h; a 1,2-butadiene solution prepared by dissolving 2 wt % of 1,2-butadiene in n-hexane at a rate of 0.025 kg/h; a ditetrahydrofurylpropane solution prepared as a polar additive by dissolving 11 wt % of ditetrahydrofurylpropane in n-hexane at a rate of 0.113 kg/h; and a n-butyl lithium solution prepared as a polymerization initiator by dissolving 15 wt % of n-butyl lithium in n-hexane at a rate of 0.0346 kg/h. At this time, the temperature of the first stage reactor was maintained at 70° C., and a residence time was adjusted to 50 minutes.

Subsequently, the polymerized product (viscosity: 2,000 cP) was transferred from the first stage reactor to the second stage reactor via a stainless tube transfer pipe having an inner diameter of 1 inch as a transfer pipe by using a gear pump. At this time, a bis(3-diethoxymethylsilylpropyl)methylamine solution prepared as a modifier by dissolving 18 wt % of bis(3-diethoxymethylsilylpropyl)methylamine in n-hexane was injected into the transfer pipe at a rate of 0.1 kg/h. After the modifier was added, the Reynolds number of the mixture of the polymerized product and the modifier, discharged from the first stage reactor, was 0.56, and a residence time inside the transfer pipe before reaching the second stage reactor was 3 minutes.

The mixture of the polymerized product and the modifier was transferred to the second stage reactor, and then the temperature of the second stage reactor was maintained at 75° C., and a residence time therein was adjusted to 30 minutes. At this time, the second stage reactor was equipped with a 242 mm three-layered impeller, and a stirring rate thereof was 100 rpm.

Subsequently, 5 ml of an IR1520 (manufactured by BASF) solution as an antioxidant was added to the polymerized solution discharged from the second stage reactor, and the resulting solution was stirred. The resulting polymerized product was added to hot water heated with steam and stirred to remove the solvent, thereby completing the preparation of a modified conjugated diene-based polymer. Analysis results of the prepared modified conjugated diene-based polymer are shown in Table 1 below.

Comparative Example 1

A modified conjugated diene-based polymer was prepared in the same manner as in Example 1, except that 1.5 g of triethoxysilylpropylaminopropylimidazole was added while the stirring rate was maintained at 300 rpm instead of decreasing the stirring rate before the addition thereof. Meanwhile, the addition of triethoxysilylpropylaminopropylimidazole was performed for 1 second, and after the addition of the modifier, the Reynolds number of the mixture of the polymerized product and the modifier in the reactor was 36.

Comparative Example 2

A modified conjugated diene-based polymer was prepared in the same manner as in Example 2, except that when the polymerized product was transferred from the first stage reactor to the second stage reactor, after adding the modifier, the mixture of the polymerized product and the modifier passed through a dynamic mixer with an impeller having a width of 60 mm installed therein and a stirring rate of 3,600 rpm, and then transferred via the transfer pipe. At this time, the mixture of the polymerized product and the modifier had a residence time of 5 seconds in the dynamic mixer, and had a Reynolds number of 50 or more when passing through the dynamic mixer.

Comparative Example 3

A modified conjugated diene-based polymer was performed in the same manner as in Example 2, except that the modifier was added immediately before the polymerized product discharge from the first stage reactor was introduced into an upper portion of the second stage reactor after transferred along the transfer pipe, and mixed with the polymerized product. At this time, after the modifier was added, a residence time in the transfer pipe before reaching the third stage reactor was 1 second or less.

Experimental Examples

Experimental Example 1

A styrene unit (SM, wt %) in the modified conjugated diene-based polymer, and a vinyl content (wt %) in the butadiene units, a weight average molecular weight (Mw) ($\times 10^3$ g/mol), a number average molecular weight (Mn) ($\times 10^3$ g/mol), a molecular weight distribution (MWD), a molecular weight ratio of 2-arms or more (%), and a Mooney viscosity (MV) of each of the modified conjugated diene-based polymers prepared according to Example 1 and Comparative Example 1 were measured, and the results thereof are shown in Table 1 below.

1) Mooney Viscosity (MV)

The MV ((ML1+4, @100° C.) MU) was measured by MV-2000 (manufactured by ALPHA Technologies) at 100° C. using a large rotor with a rotor speed of 2±0.02 rpm. At this time, samples used were maintained at room temperature (23±3° C.) for 30 minutes or more and then two samples of 15 g to 20 g were collected and filled into die cavities, and then preheated by Platen for 1 minute, and then the MV was measured for 4 minutes.

2) Styrene and Vinyl Content

A styrene unit (SM, wt %) in the modified conjugated diene-based polymer, and a vinyl content (wt %) in the butadiene unit of was measured and analyzed by Varian VNMRS 500 MHz NMR.

3) Mw ($\times 10^3$ g/Mol), Mn ($\times 10^3$ g/Mol), MWD, and Molecular Weight Ratio (%) of 2-Arms or More The Mw and the Mn were measured by gel permeation chromatography (GPC), the MWD (Mw/Mn) was obtained by calculation from each of the measured molecular weights, and the molecular weight ratio of 2-arms or more was obtained by converting a total molecular weight of the modified polymer shown in the measured GPC graph into 100 and calculating a rate of two or more polymers bonded, excluding a rate of one polymer bonded, in a multimodal (bimodal or more) distribution. In particular, a column used was a combination of two PLgel Olexis columns (manufactured by Polymer Laboratories) and one PLgel mixed-C column (manufactured by Polymer Laboratories), and all newly replaced columns were mixed bed-type columns. In addition, polystyrene (PS) was used as a GPC standard material for the calculation of molecular weights.

TABLE 1

|  | Example 1 | Comparative Example 1 |
|---|---|---|
| MV (ML1 + 4, 100° C.) | 67 | 61 |
| SM (wt %) | 26.5 | 27.0 |
| Vi (wt %) | 43.0 | 42.2 |
| Mw ($\times 10^3$ g/mol) | 410 | 310 |
| Mn ($\times 10^3$ g/mol) | 250 | 220 |
| MWD (Mw/Mn) | 1.64 | 1.41 |
| Molecular weight ratio of 2-arms or more (%) | 49 | 34 |

As shown in Table 1 above, it was confirmed that the modified conjugated diene-based polymer prepared in Example 1 according to the present invention, in which the active polymer and the modifier were subjected to mixing by laminar flow behavior and a reaction therebetween in the reactor, exhibited a high rate of long chain bonds due to a high molecular weight ratio of 2-arms or more, and exhibited a high MV due to a high Mw. In contrast, it was confirmed that the modified conjugated diene-based polymer prepared according to Comparative Example 1, in which mixing of and a reaction between the active polymer and the modifier were performed by turbulent flow behavior in a state in which the impeller installed in the reactor maintained a high stirring rate, exhibited a low long chain rate because the polymer and the modifier were not smoothly mixed.

Experimental Example 2

A styrene unit (SM, wt %) in the modified conjugated diene-based polymer, and a vinyl content (wt %) in the butadiene units, an Mw ($\times 10^3$ g/mol), an Mn ($\times 10^3$ g/mol), an MWD, and an MV of each of the modified conjugated diene-based polymers prepared in Example 2 and Comparative Examples 2 and 3 were measured using the same method as that used in Experimental Example 1 above, and the results thereof are shown in Table 2 below.

TABLE 2

|  | Example | Comparative Example | |
|---|---|---|---|
|  | 2 | 2 | 3 |
| MV (ML1 + 4, 100° C.) | 62 | 65 | 66 |
| SM (wt %) | 20.9 | 21.1 | 20.5 |
| Vi (wt %) | 48.9 | 50.1 | 49.3 |
| Mw ($\times 10^3$ g/mol) | 540 | 540 | 540 |
| Mn ($\times 10^3$ g/mol) | 270 | 280 | 280 |
| MWD (Mw/Mn) | 2.0 | 1.93 | 1.93 |

Subsequently, to compare and analyze physical properties of a rubber composition including each of the modified conjugated diene-based copolymers of Example 2 and Comparative Examples 2 and 3 and a molded product manufactured therefrom, tensile properties and viscoelastic properties thereof were measured, and the results thereof are shown in Table 4 below.

1) Preparation of Rubber Specimens

Raw materials were mixed under mixing conditions shown in Table 3 below, with respect to 100 parts by weight of raw rubber. The raw rubber was composed of 65 wt % of each of the modified conjugated diene-based polymers of the example and comparative examples and 35 wt % of polybutadiene rubber (BR).

TABLE 3

|  | Raw materials | Amount (parts by weight) |
|---|---|---|
| Primary kneading | Raw rubber | 100 |
|  | Silica | 95.0 |
|  | Coupling agent | 7.6 |
|  | Process oil | 40 |
|  | Zinc white | 3.0 |
|  | Stearic acid | 2.0 |
|  | Antioxidant | 2.0 |
|  | Antiaging agent | 3.0 |
| Secondary kneading | Sulfur | 1.5 |
|  | Vulcanization accelerator | 3.75 |
|  | Total weight | 257.85 |

In particular, each of the rubber specimens was kneaded through primary kneading and secondary kneading. In the primary kneading, the raw rubber (conjugated diene-based polymer), a filler, an organosilane coupling agent, process oil, zinc white, stearic acid, an antioxidant, and an antiaging agent were kneaded using a Banbury mixer equipped with a temperature controller. At this time, the temperature of the kneader was controlled and a primary mixture (compound master batch (CMB)) was obtained at a discharge temperature of 145° C. to 155° C. In the secondary kneading, the primary mixture (CMB) was cooled to room temperature, and then the primary mixture (CMB), sulfur, and a vulcanization accelerator were added to the kneader and mixed at a temperature of 100° C. or less to obtain a secondary mixture. Lastly, the secondary mixture was subjected to a curing process at 100° C. for 20 minutes, thereby completing the preparation of rubber specimens (final master batch (FMB)).

2) Tensile Properties

To evaluate tensile properties, each test piece was prepared in accordance with a tensile testing method of ASTM 412 and tensile stress (300% modulus) of the test piece at an elongation of 300% was measured. In particular, the tensile properties were measured at room temperature and a rate of 50 cm/min using Universal Test Machine 4204 (manufactured by INSTRON) as a tensile tester.

3) MV and Payne Effect (ΔG') of CMB and FMB

MVs of the CMB and the FMB were measured using the same method as that used in above 1) of Experimental Example 1, and the Payne effect was represented by a different between the minimum value and the maximum value of G' (Shear storage modulus) of the rubber specimen in strain 0.28% to 40%. A lower value of ΔG' indicates a higher dispersibility of the filler such as silica.

4) Viscoelastic Properties

To evaluate viscoelastic properties, tan δ was measured using EPLEXOR 500N manufactured by GABO and by dynamic mechanical thermal spectrometry (DMTS) at a frequency of 10 Hz, a static strain of 3%, a dynamic strain of 0.25%, and a measurement temperature of −60° C. to 70° C. At this time, as tan δ at 0° C., which is a low temperature, increases, higher braking performance, such as wet skid resistance and the like, is exhibited, and, as tan δ at 60° C., which is a high temperature, decreases, a lower hysteresis loss, lower rolling resistance, and lower driving resistance (higher fuel efficiency) are exhibited.

TABLE 4

| | | Example | Comparative Example | |
|---|---|---|---|---|
| | | 2 | 2 | 3 |
| CMB | MV | 70 | 75 | 76 |
| | ΔG' | 0.55 | 0.60 | 0.60 |
| FMB | MV | 62 | 65 | 66 |
| | ΔG' | 0.51 | 0.56 | 0.57 |
| 300% modulus (kg · f/cm$^2$) | | 124 | 116 | 117 |
| tan δ@0° C. | | 0.413 | 0.395 | 0.398 |
| tan δ@60° C. | | 0.143 | 0.150 | 0.150 |

As shown in Table 4 above, it was confirmed that the modified conjugated diene-based polymer prepared in Example 1 according to the present invention exhibited an increase of about 10% or more in MV as an index of processability during mixing, a decrease of about 10% or more in Payne Effect (ΔG'), an improvement of about 5% or more in 300% modulus, an improvement of about 10% or more of tan δ at 0° C., and an improvement of about 5% or more in tan δ at 60° C., as compared to the modified conjugated diene-based polymers of Comparative Examples 1 and 2, prepared by adding the same monomer and the same modifier in the same amounts, wherein the case of Comparative Example 1 could not maintain the Reynolds number when the modifier was added and the case of Comparative Example 2 had an insufficient residence time during mixing by using a dynamic mixer.

That is, from the above-described results, it was confirmed that, when the modified conjugated diene-based polymer prepared according to the present invention was included in a tire, the processed tire exhibited excellent processability, excellent braking performance on a rod surface, and low rolling resistance.

MODE OF THE INVENTION

Hereinafter, the present invention will be described in more detail to aid in understanding of the present invention.

The terms or words used in the present specification and claims should not be construed as being limited to ordinary or dictionary meanings and should be construed as having meanings and concepts consistent with the spirit of the present invention based on a principle that an inventor can appropriately define concepts of terms to explain the invention of the inventor in the best way.

A method of preparing a modified conjugated diene-based polymer, according to the present invention, includes: preparing an active polymer with an organic metal bonded thereto by polymerizing a conjugated diene-based monomer in a hydrocarbon solvent in the presence of an organometallic compound (S1); and mixing the active polymer prepared according to process S1 with a modifier (S2), in which the mixing of process S2 is performed at a Reynolds number of 20 or less for 1 minute or more, the Reynolds number being maintained within a range of ±5 of a Reynolds number when the modifier is added (wherein the range is between greater than 0 to 20 or less).

The conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene wherein halo denotes a halogen atom.

Meanwhile, the polymerizing of process S1 may be performed by including an aromatic vinyl monomer. In this case, the active polymer prepared by process S1 may be an active copolymer, which the conjugated diene-based monomer and the aromatic vinyl monomer are copolymerized. The aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

When the polymerizing of process S1 is performed by including the aromatic vinyl monomer, the conjugated diene-based monomer may be included in an amount of 50 wt % to 95 wt %, 55 wt % to 90 wt %, or 60 wt % to 85 wt % with respect to 100 wt % of a mixture of the conjugated diene-based monomer and the aromatic vinyl monomer, and the aromatic vinyl monomer may be included in an amount of 5 wt % to 50 wt %, 10 wt % to 45 wt %, or 15 wt % to 40 wt % with respect to 100 wt % of the mixture of the conjugated diene-based monomer and the aromatic vinyl monomer. When the amounts of the conjugated diene-based monomer and the aromatic vinyl monomer are within the above-described ranges, low rolling resistance and excellent wet skid resistance may be obtained.

According to an embodiment of the present invention, when the polymerizing of process S1 is performed by including the aromatic vinyl monomer, the prepared active copolymer may be a random copolymer, and an excellent balance between physical properties thereof is obtained. The random copolymer may refer to a copolymer having repeating units randomly arranged.

According to an embodiment of the present invention, the polymerizing of process S1 may also be performed by including, in addition to the conjugated diene-based monomer, a $C_1$ to $C_{10}$ diene-based monomer, and the diene-based monomer may be, for example, 1,2-butadiene.

Meanwhile, the hydrocarbon solvent is not particularly limited, and may be, for example, one or more selected from the group consisting of n-pentane, n-hexane, n-heptane, isooctane, cyclohexane, toluene, benzene, and xylene.

According to an embodiment of the present invention, the organometallic compound may be used in an amount of 0.01 mmol to 10 mmol, 0.05 mmol to 5 mmol, 0.1 mmol to 2 mmol, 0.1 mmol to 1 mmol, or 0.15 mmol to 0.8 mmol, based on the total 100 g of the monomer.

The organometallic compound may be, for example, one or more selected from the group consisting of methyl lithium, ethyl lithium, propyl lithium, isopropyl lithium, n-butyl lithium, s-butyl lithium, t-butyl lithium, hexyl lithium, n-decyl lithium, t-octyl lithium, phenyl lithium, 1-naphthyl lithium, n-eicosyl lithium, 4-butylphenyl lithium, 4-tolyl lithium, cyclohexyl lithium, 3,5-di-n-heptyl cyclohexyl lithium, 4-cyclopentyl lithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropyl amide.

Meanwhile, the polymerizing of process S1 may be performed by including a polar additive, and the polar additive may be added in an amount of 0.001 g to 50 g, 0.001 g to 10 g, or 0.005 g to 0.1 g, based on the total 100 g of the monomer.

In another embodiment, the polar additive may be added in an amount of 0.001 g to 10 g, 0.005 g to 5 g, or 0.005 g to 0.1 g, based on the total 1 mmol of the organometallic compound.

The polar additive may be, for example, one or more selected from the group consisting of tetrahydrofuran, ditetrahydrofurylpropane, diethylether, cycloamylether, dipropylether, ethylenemethylether, ethylenedimethylether, diethylglycol, dimethylether, tert-butoxyethoxyethane, bis(3-dimethylaminoethyl) ether, (dimethylaminoethyl)ethylether, trimethylamine, triethylamine, tripropylamine, and tetramethylethylenediamine. Preferably, the polar additive may be trimethylamine or tetramethylethylenediamine. In a case in which the polar additive is included, when the conjugated diene-based monomer, or the conjugated diene-based monomer and the aromatic vinyl monomer are copolymerized, a difference between reaction rates thereof may be compensated for such that easy formation of a random copolymer is induced.

In process S1, the polymerization may be, for example, anionic polymerization. Specifically, the polymerization may be living anionic polymerization in which a polymerized end has an anion active site through a growth polymerization reaction by anions. In addition, the polymerization in process S1 may be heating polymerization, isothermal polymerization, or room-temperature polymerization (adiabatic polymerization). The room-temperature polymerization may refer to a polymerization method including performing polymerization with a reaction heat itself without arbitrarily applying heat after the organometallic compound is added, the heating polymerization may refer to a polymerization method in which the organometallic compound is added and then heat is applied to increase the reaction temperature, and the isothermal polymerization may refer to a polymerization method in which the organometallic compound is added and then heat is applied thereto to increase the temperature or take heat away therefrom to constantly maintain the temperature of the polymerized product. In addition, the polymerizing of process S1 may be performed at a temperature ranging from, for example, −20° C. to 200° C., 0° C. to 150° C., 10° C. to 120° C., or 30° C. to 100° C.

The active polymer prepared by process S1 may mean a polymer having anions bonded to cations of the organic metal.

According to an embodiment of the present invention, the method of preparing a modified conjugated diene-based polymer may be performed by a continuous polymerization method using N reactors wherein N is an integer selected from 2 to 10. In particular, process S1 may be continuously performed in an N−1 reactor wherein N is an integer selected from 2 to 10, and the number (N) of the reactors may be appropriately determined according to reaction conditions and a reaction environment. The continuous polymerization method may refer to a reaction process in which reactants are continuously supplied to a reactor and the resulting reaction product is continuously discharged therefrom. When the continuous polymerization method is used, excellent productivity and processability are obtained and the prepared polymer has excellent uniformity.

According to an embodiment of the present invention, process S2 may be performed in a transfer part to transfer the active polymer from an N−1$^{th}$ stage reactor to an N$^{th}$ stage reactor, e.g., a pipe to transfer the active polymer from the N−1$^{th}$ stage reactor to the N$^{th}$ stage reactor. In another embodiment, the transfer part may include a mixer to enhance mixing performance when the active polymer and the modifier are mixed to be within a range at which the Reynolds number is maintained. In particular, the mixer may be a static mixer.

According to an embodiment of the present invention, the modifier may be added to the transfer part to which the active polymer discharged from the N−1$^{th}$ stage reactor is transferred. In this case, while the active polymer discharged from the N−1$^{th}$ stage reactor is transferred to the N$^{th}$ stage reactor, the active polymer is premixed with the added modifier before being introduced into the N$^{th}$ stage reactor, whereby reaction efficiency or coupling efficiency in the N$^{th}$ stage reactor may be enhanced. In addition, a reaction or coupling may proceed by mixing the active polymer and the modifier in the transfer part and, accordingly, the reaction or coupling may proceed at a more uniform and higher rate than that in a case in which the modifier is added to the N$^{th}$ stage reactor.

According to an embodiment of the present invention, in the mixing of process S2, the active polymer and the modifier may be a fluid in the form of a solution prepared by being dispersed or dissolved in the hydrocarbon solvent added in the polymerizing of process S1, and the fluid may have a Reynolds number of 20 or less, 0.001 to 20, or 0.01 to 15. When the Reynolds number of the fluid is within the above range, a laminar flow thereof is maintained, and thus mixing of the active polymer and the modifier may be adjusted, and, accordingly, a polymer prepared by a reaction or coupling between the active polymer and the modifier by mixing in the reactor or transfer part may be in a form having a branched structure.

Meanwhile, the Reynolds number may be used to indicate the behavior of a fluid flowing through the transfer part, generally, a tube type. However, in the present invention, the Reynolds number may be used to indicate both the behavior of the fluid flowing through the tube-type transfer part and the behavior of the fluid flowing while being rotated in the reactor by the mixer installed therein. According to an embodiment of the present invention, the Reynolds number may mean that, when the active polymer and the modifier are mixed in the reactor or the transfer part, the flow of the fluid has laminar flow behavior, not turbulent flow behavior. In particular, the Reynolds number may be used to indicate that, when the active polymer and the modifier are mixed by the mixer installed in the reactor, the mixing thereof is performed by laminar flow behavior due to low-speed rotation of the mixer, not by turbulent flow behavior due to high-speed rotation of the mixer. In another embodiment, the Reynolds number may be used to indicate that the active polymer and the modifier are mixed by laminar flow behavior in a process in which the active polymer and the modifier are transferred in the transfer part. That is, according to an embodiment of the present invention, the mixing of process S2 may be performed by laminar flow behavior.

In another embodiment, the Reynolds number ($N_{Re}$) may be calculated by Equation 1 below:

$$\text{Reynolds number}(N_{Re}) = \frac{\rho v d}{\mu} \quad \text{[Equation 1]}$$

wherein, in Equation 1 above, ρ denotes the density of a fluid, v denotes a flowing rate of the fluid in the transfer part, d is an inner diameter of the transfer part, and μ denotes the viscosity of the fluid.

Variables of the Reynolds number, i.e., the density of a fluid, the flowing rate of the fluid, the inner diameter of the transfer part, and the viscosity of the fluid, may be relatively adjusted within a range satisfying the Reynolds number in the mixing of process S2. In particular, when the inner diameter of the transfer part ranges from 0.01 m to 0.05 m, the Reynolds number may range from 0.01 to 1, and, when the inner diameter of the transfer part ranges from 0.1 m to 0.5 m, the Reynolds number may range from 8 to 20. That is, the method of preparing a modified conjugated diene-based polymer, according to the present invention, may be understood as including all changes in the Reynolds number according to a manufacturing environment (laboratory unit, mass production unit, and the like).

According to an embodiment of the present invention, the density ρ and viscosity μ of the fluid may depend on the active polymer and the modifier, discharged from the N-1$^{th}$ stage reactor, the density ρ of the fluid may range from 0.68 g/cm$^3$ to 0.8 g/cm$^3$, 0.69 g/cm$^3$ to 0.77 g/cm$^3$, or 0.7 g/cm$^3$ to 0.75 g/cm$^3$, and the viscosity μ of the fluid may range from 100 cP to 10,000 cP, 500 cP to 8,000 cP, or 1,000 cP to 5,000 cP. When the density ρ and viscosity μ of the fluid are within the above-described ranges, a laminar flow is maintained, and thus a mixing rate of the active polymer and the modifier may be controlled, and a reaction or coupling between the active polymer and the modifier may proceed through mixing in the transfer part.

According to an embodiment of the present invention, unlike the density ρ and viscosity μ of the fluid that are determined according to properties of the fluid, the flowing rate v of the fluid in the transfer part and the inner diameter d of the transfer part may be adjustable variables to maintain the Reynolds number within a particular range. The flowing rate v of the fluid in the transfer part may be adjusted by a pump separately installed in the transfer part, in particular, a gear pump.

In addition, as described above, the inner diameter d of the transfer part may be adjusted according to a manufacturing environment (laboratory unit, mass production unit, and the like), and, in particular, may range from 0.01 m to 1 m, 0.05 m to 0.8 m, or 0.1 m to 0.5 m. When the inner diameter d of the transfer part is within the above range, a laminar flow is maintained, and thus the active polymer and the modifier may be uniformly mixed, and a reaction or coupling between the active polymer and the modifier may proceed through mixing in the transfer part.

According to an embodiment of the present invention, the Reynolds number may be maintained within a range of ±5, ±3, or ±1 (between greater than 0 to 20 or less) of a Reynolds number at a time at which the modifier is added, i.e., the active polymer is discharged from the N-1$^{th}$ stage reactor and the modifier is added to the inside of the transfer part. When the Reynolds number is within the above range, the active polymer and the modifier may be uniformly mixed. A change in the Reynolds number may be derived from, for example, a change in the viscosity of the fluid according to the progress of the reaction or coupling between the active polymer and the modifier through mixing in the transfer part, i.e., a change in the viscosity of the polymer in the fluid.

In another embodiment, the mixing of process S2 may be performed at a temperature ranging from 0° C. to 90° C. or 10° C. to 80° C. for 1 minute or more, 1 minute to 5 minutes, or 1 minute to 3 minutes. When the mixing temperature and time are within the above-described ranges, the active polymer and the modifier may be mixed while maintaining a laminar flow state, and a reaction or coupling between the active polymer and the modifier may proceed through mixing in the transfer part.

Meanwhile, the method of preparing a modified conjugated diene-based polymer, according to the present invention, may further include reacting or coupling the active polymer and the modifier mixed in process S2(S3). The reacting or coupling of process S3, which is a process of performing a sufficient reaction between the active polymer and the modifier mixed in process S2, may be performed in the N$^{th}$ stage reactor, wherein N is an integer of 2 to 10. The modified conjugated diene-based polymer prepared by process S3 exhibits a higher modification rate than that of a modified conjugated diene-based polymer that has not gone through the mixing of process S2 and, accordingly, a rubber composition including the modified conjugated diene-based polymer may have excellent mechanical and physical properties in terms of tensile properties, viscoelastic properties, and the like.

The modification rate of the modified conjugated diene-based polymer may be 60% or more, 70% or more, or in the range of 80% to 100%. When the modification rate of the modified conjugated diene-based polymer is within the above range, a rubber composition including the modified conjugated diene-based polymer may have excellent mechanical and physical properties in terms of tensile properties, viscoelastic properties, and the like. The modification rate may refer to a rate of the modified conjugated diene-based polymer reacted or coupled with the modifier in the active polymer prepared by process S1.

The modifier according to the present invention may be a modifier for modifying an end of the conjugated diene-based polymer, in particular, an alkoxysilane-based modifier, more particularly, a nitrogen atom-containing alkoxysilane-based modifier. When the alkoxysilane-based modifier is used, one end of the active polymer may be modified in a form bonded to a silyl group through a substitution reaction between an anion active site located at one end of the active polymer and an alkoxy group of the alkoxysilane-based modifier, and thus chemical affinity with an inorganic filler or the like is enhanced due to the modifier-derived functional group present at one end of the modified conjugated diene-based polymer, and, accordingly, a rubber composition including the modified conjugated diene-based polymer may have enhanced mechanical and physical properties. In addition, when the nitrogen atom-containing alkoxysilane-based modifier is used, an additional physical property enhancement effect derived from the nitrogen atom may be expected, in addition to the effect derived from the silyl group.

According to an embodiment of the present invention, the modifier may include a compound represented by Formula 1 below:

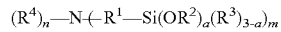 <Formula 1> wherein, in Formula 1 above, $R^1$ may be a $C_1$-$C_{10}$ alkylene group, each of $R^2$ and $R^3$ may independently be a $C_1$-$C_{10}$ alkyl group, $R^4$ may be hydrogen, a $C_1$-$C_{10}$ alkyl group, or a divalent, trivalent or tetravalent alkylsilyl group unsubstituted or substituted with a $C_1$-$C_{10}$ alkyl group, each of a and m may independently be an integer selected from 1, 2, and 3, and n may be an integer selected from 0, 1, and 2, wherein, when n is 2, a plurality of $R^9$ groups may be identical to or different from each other.

In particular, in Formula 1 above, each of $R^2$ and $R^3$ may independently be hydrogen or a $C_1$-$C_5$ alkyl group, $R^4$ may be hydrogen or a $C_1$-$C_5$ alkyl group, $R^1$ may be a $C_1$-$C_5$ alkylene group, a may be an integer of 2 or 3, and each of m and n may independently be an integer of 1 or 2, wherein m+n=3, and, when n is 2, plural $R^9$ groups may be identical to or different from each other.

More particular, the compound of Formula 1 above may be one selected from the group consisting of compounds represented by Formulae 1-1 to 1-6 below:

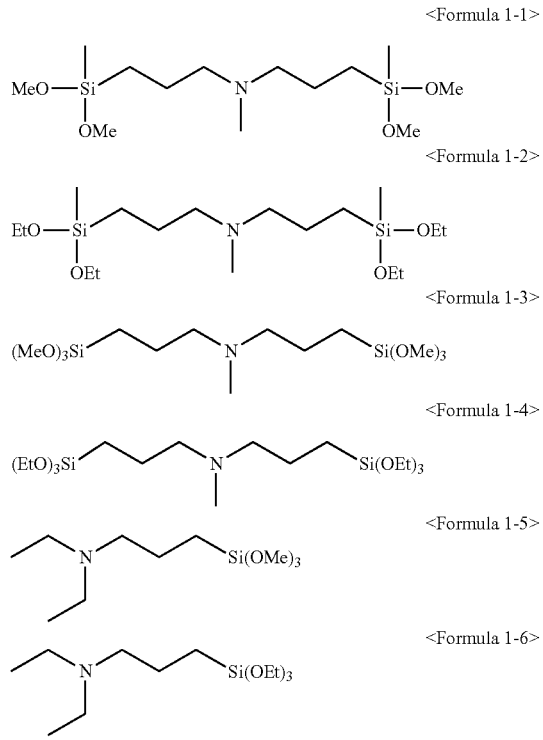

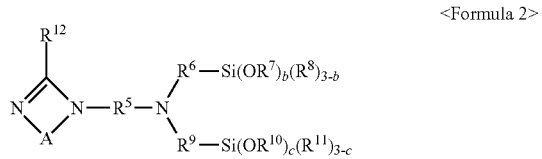

wherein, in Formulae 1-1 to 1-6 above, Me denotes a methyl group, and Et denotes an ethyl group.

In another embodiment, the modifier may include a compound represented by Formula 2 below:

<Formula 2>

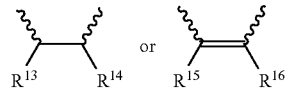

wherein, in Formula 2 above, each of $R^5$, $R^6$, and $R^9$ may independently be a $C_1$-$C_{10}$ alkylene group, each of $R^7$, $R^8$, $R^{10}$, and $R^{11}$ may independently be a $C_1$-$C_{10}$ alkyl group, $R^{12}$ may be hydrogen or a $C_1$-$C_{10}$ alkyl group, each of b and c may independently be 0, 1, 2, or 3, b+c≥1, and A may be

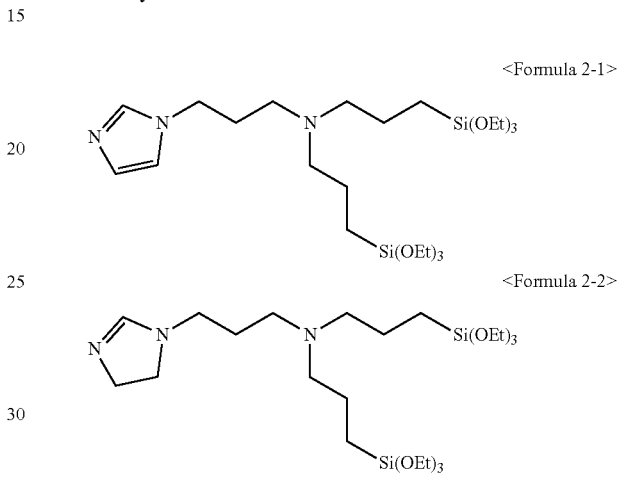

wherein each of $R^{13}$, $R^{14}$, $R^{15}$, and $R^{16}$ may independently be hydrogen, or a $C_1$-$C_{10}$ alkyl group.

In particular, the compound of Formula 2 above may be one selected from the group consisting of compounds represented by Formulae 2-1 and 2-2 below:

wherein, in Formulae 2-1 and 2-2 above, Et denotes an ethyl group.

According to an embodiment of the present invention, the modifier may be used in an amount of 0.01 mmol to 10 mmol based on the total 100 g of the monomer.

In another embodiment, the modifier may be used in a molar ratio of 1:0.1 to 10, 1:0.1 to 5, or 1:0.1 to 1:2, based on 1 mole of the organometallic compound of process S1.

According to the present invention, a modified conjugated diene-based polymer prepared according to the method of preparing a modified conjugated diene-based polymer is provided. The modified conjugated diene-based polymer may include a repeating unit derived from a conjugated diene-based monomer and a modifier-derived functional group. The repeating unit derived from a conjugated diene-based monomer may refer to a repeating unit obtained when the conjugated diene-based monomer is polymerized, and the modifier-derived functional group may refer to a functional group derived from the modifier present on one end of the active polymer through a reaction or coupling between the active polymer and the modifier.

Meanwhile, the modified conjugated diene-based polymer may be, for example, a copolymer further including a repeating unit derived from an aromatic vinyl monomer, in addition to the repeating unit derived from a conjugated diene-based monomer. When the modified conjugated diene-based polymer is a copolymer including the repeating unit derived from an aromatic vinyl monomer, the modified conjugated diene-based polymer may include 50 wt % to 95 wt %, 55 wt % to 90 wt %, or 60 wt % to 85 wt % of the repeating unit derived from a conjugated diene-based monomer and 5 wt % to 50 wt %, 10 wt % to 45 wt %, or 15 wt % to 40 wt % of the repeating unit derived from an aromatic vinyl monomer. When the amounts of the repeating units derived from a conjugated diene-based monomer and an aromatic vinyl monomer are within the above ranges, low rolling resistance and excellent wet skid resistance may be obtained.

In addition, according to an embodiment of the present invention, the modified conjugated diene-based polymer may be a copolymer further including a repeating unit derived from a diene-based monomer different from the conjugated diene-based monomer, in addition to the repeating unit derived from a conjugated diene-based monomer.

According to an embodiment of the present invention, the copolymer may be a random copolymer and, in this case, an excellent balance between physical properties may be obtained. The random copolymer may refer to a copolymer having repeating units randomly arranged.

The modified conjugated diene-based polymer according to an embodiment of the present invention may have an Mn of 1,000 g/mol to 2,000,000 g/mol, 10,000 g/mol to 1,000,000 g/mol, or 100,000 g/mol to 500,000 g/mol. When the Mn of the modified conjugated diene-based polymer is within the above range, low rolling resistance and excellent wet skid resistance may be obtained. In another embodiment, the modified conjugated diene-based polymer may have an MWD (Mw/Mn) of 0.5 to 10, 0.5 to 5, or 1 to 3, and, when the MWD thereof is within the above range, an excellent balance between physical properties may be obtained.

In another embodiment, the modified conjugated diene-based polymer may have an MV of 40 or more, 40 to 90, or 50 to 80, at 100° C. When the MV of the modified conjugated diene-based polymer is within the above range, excellent processability and productivity may be obtained.

In addition, the modified conjugated diene-based polymer may have a vinyl content of 5 wt % or more, 10 wt % or more, or 10 wt % to 60 wt %. In this regard, the vinyl content may refer to the amount of a 1,2-added conjugated diene-based monomer, not the amount of a 1,4-added conjugated diene-based monomer, with respect to 100 wt % of a conjugated diene-based copolymer consisting of a vinyl group-containing monomer and an aromatic vinyl-based monomer.

According to the present invention, a rubber composition including the modified conjugated diene-based polymer is provided.

The rubber composition may include the modified conjugated diene-based polymer in an amount of 10 wt % or more, 10 wt % to 100 wt %, or 20 wt % to 90 wt %. When the amount of the modified conjugated diene-based polymer in the rubber composition is within the above range, excellent mechanical and physical properties such as tensile properties and the like and an excellent balance between the physical properties may be obtained.

The rubber composition may further include other rubber components as necessary, in addition to the modified conjugated diene-based polymer, and the rubber components may be included in an amount of 90 wt % or less with respect to the total weight of the rubber composition. In particular, the other rubber components may be included in an amount of 1 part by weight to 900 parts by weight with respect to 100 parts by weight of the modified conjugated diene-based polymer.

The rubber component may be, for example, a natural rubber or synthetic rubber, and examples of such rubber components include: a natural rubber (NR) including cis-1,4-polyisoprene; a modified NR obtained by modifying or purifying such general NR, such as epoxidized NR (ENR), deproteinized NR (DPNR), hydrogenated NR, and the like; and a synthetic rubber such as a styrene-butadiene rubber (SBR) copolymer, polybutadiene rubber (BR), polyisoprene rubber (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber, butyl rubber, halogenated butyl rubber, and the like. Any one selected from the above-listed materials or a mixture of two or more of these materials may be used.

The rubber composition may include, for example, a filler in an amount of 0.1 parts by weight to 200 parts by weight, or 10 parts by weight to 120 parts by weight, with respect to 100 parts by weight of the modified conjugated diene-based polymer of the present invention. The filler may be, for example, a silica-based filler, in particular, wet silica (hydrous silicic acid), dry silica (anhydrous silicic acid), calcium silicate, aluminum silicate, colloidal silica, or the like. Among these, wet silica having both the best breakage resistance improvement effect and the best wet grip effect may be preferably used. In addition, the rubber composition may further include a carbon black-based filler as necessary.

In another embodiment, when silica is used as the filler, a silane coupling agent may be used therewith to improve the reinforcing property and the low exothermicity, for example, bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemono sulfide, 3-trimethoxysilylpropylmethacrylate-monosulfide, bis(3-diethoxymethylsilylpropyl)tetrasulfide, 3-mercaptopropyldimethoxymethylsilane, dimethoxymethylsilylpropyl-N,N-dimethylthiocarbamoyltetrasulfide, dimethoxymethylsilylpropylbenzothiazolyltetrasulfide, or the like. Preferably, in consideration of the effect of improving reinforcement properties, bis(3-triethoxysilylpropyl)polysulfide or 3-trimethoxysilylpropylbenzothiazyltetrasulfide may be used.

In addition, since the rubber composition according to an embodiment of the present invention uses the modified conjugated diene-based polymer in which a functional group with high chemical affinity with silica is introduced into an active site thereof, as a rubber component, the amount of the silane coupling agent to be mixed therewith may be decreased as compared to a general case, and thus, the silane coupling agent may be used in an amount of 1 part by weight to 20 parts by weight, or 5 parts by weight to 15 parts by weight, with respect to 100 parts by weight of silica. When the amount of the silane coupling agent is within the above range, an effect as a coupling agent may be sufficiently achieved and an effect of preventing the rubber component from being gelled may be obtained.

The rubber composition according to an embodiment of the present invention may be sulfur-crosslinkable, and may further include a vulcanizing agent. The vulcanizing agent may be, in particular, sulfur powder, and may be included in an amount of 0.1 parts by weight to 10 parts by weight with respect to 100 parts by weight of the rubber component. When the amount of the vulcanizing agent is within the above range, elastic modulus and strength needed for a vulcanized rubber composition may be secured and high fuel efficiency may also be obtained.

The rubber composition according to an embodiment of the present invention may further include a variety of additives commonly used in the rubber industry, in particular, a vulcanization accelerator, process oil, a plasticizer, an antiaging agent, a scorch inhibitor, zinc white, stearic acid, thermosetting resin, thermoplastic resin, or the like, in addition to the above-listed components.

The vulcanization accelerator may be, for example, a thiazol-based compound such as 2-mercaptobenzothiazol (M), dibenzothiazyldisulfide (DM), N-cyclohexyl-2-benzothiazylsulfeneamide (CZ), or the like, or a guanidine-based compound such as diphenylguanidine (DPG) or the like, and may be included in an amount of 0.1 parts by weight to 5 parts by weight with respect to 100 parts by weight of the rubber component.

The process oil acts as a softener in the rubber composition, for example, a paraffin-based compound, a naphthene-based compound, or an aromatic compound. An aromatic process oil may be used in consideration of tensile strength and wear resistance, and a naphthene- or paraffin-based process oil may be used in consideration of hysteresis loss and low-temperature properties. The process oil may be included in an amount of, for example, 100 parts by weight or less with respect to 100 parts by weight of the rubber component. When the amount of the process oil is within the above range, an effect of preventing a decrease in tensile strength and low exothermicity (fuel efficiency) of the vulcanized rubber is obtained.

The antiaging agent may be, for example, N-isopropyl-N-phenyl-p-phenylenediamine, N-(1,3-dimethylbutyl)-N'-phenyl-p-phenylenediamine, 6-ethoxy-2,2,4-trimethyl-1,2-dihydroquinoline, a high-temperature condensed product of diphenylamine and acetone, or the like, and may be used in an amount of 0.1 parts by weight to 6 parts by weight with respect to 100 parts by weight of the rubber component.

The rubber composition according to an embodiment of the present invention may be obtained by kneading using a kneader such as a Banbury mixer, a roll, an internal mixer, or the like according to the mixing formulation, and a rubber composition with excellent low exothermicity and high wear resistance may be obtained by a vulcanizing process after molding processing.

Accordingly, the rubber composition may be usefully used in the manufacture of tire components such as tire treads, under treads, sidewalls, carcass-coated rubber, belt-coated rubber, bead fillers, chasers, bead-coated rubber, and the like, or in the manufacture of rubber products for various industries such as anti-vibration rubber, belt conveyors, hoses, and the like.

The present invention also provides a tire manufactured using the above-described rubber composition.

The tire may include a tire or a tire tread.

The invention claimed is:

1. A method of preparing a modified conjugated diene-based polymer, the method comprising:
   (S1) preparing an active polymer with an organic metal bonded thereto by polymerizing a conjugated diene-based monomer in a hydrocarbon solvent in the presence of an organometallic compound;
   (S2) mixing the active polymer prepared according to process S1 with a modifier, and
   (S3) reacting or coupling the active polymer and the modifier mixed in process S2,
   wherein the mixing process S2 is performed at a Reynolds number of 20 or less for 1 minute or more to maintain laminar flow behavior thereof, wherein the Reynolds number is maintained between greater than 0 and 20 or less, and with a difference in range of ±5 of the Reynolds number when the modifier is added, wherein the Reynolds number is calculated by Equation 1:

$$\text{Reynolds number } (N_{Re}) = \frac{\rho v d}{\mu} \quad \text{[Equation 1]}$$

wherein, in Equation 1 above, p denotes density of a fluid, v denotes a flowing rate of the fluid in a transfer part, d is an inner diameter of the transfer part, and µ denotes the viscosity of the fluid.

2. The method of claim 1, wherein the polymerizing process S1 is performed by including an aromatic vinyl monomer.

3. The method of claim 1, wherein the polymerizing process S1 is continuously performed in an N−1 reactor wherein N is an integer selected from 2 to 10.

4. The method of claim 1, wherein the mixing process S2 is performed in a transfer part to transfer the active polymer from an N−1$^{th}$ stage reactor to an N$^{th}$ stage reactor.

5. The method of claim 4, wherein the modifier is added to the transfer part.

6. The method of claim 1, wherein the reacting or coupling of process S3 is performed in an N$^{th}$ stage reactor, wherein N is an integer selected from 2 to 10.

7. The method of claim 1, wherein the modifier is an alkoxysilane-based modifier.

* * * * *